(12) United States Patent
Artuphel et al.

(10) Patent No.: US 7,473,676 B2
(45) Date of Patent: Jan. 6, 2009

(54) COMPOSITIONS CONTAINING FLUORINATED HYDROCARBONS AND OXYGENATED SOLVENTS

(75) Inventors: Benoit Artuphel, Paris (FR); Jean-Pierre Lallier, Saint Bonnet de Mure (FR); Emmanuel Rastelletti, Venissieux (FR)

(73) Assignee: Arkema France, Colombes (FR)

( * ) Notice: Subject to any disclaimer, the term of this patent is extended or adjusted under 35 U.S.C. 154(b) by 317 days.

(21) Appl. No.: 10/535,691

(22) PCT Filed: Jan. 13, 2004

(86) PCT No.: PCT/FR2004/000049

§ 371 (c)(1),
(2), (4) Date: May 19, 2005

(87) PCT Pub. No.: WO2004/072218

PCT Pub. Date: Aug. 26, 2004

(65) Prior Publication Data

US 2006/0052268 A1      Mar. 9, 2006

(30) Foreign Application Priority Data

Jan. 17, 2003      (FR)      .................................. 03 00529

(51) Int. Cl.
*C11D 7/50*      (2006.01)

(52) U.S. Cl. .................. 510/407; 510/505; 510/506
(58) Field of Classification Search ................ 510/407, 510/505, 506
See application file for complete search history.

(56) References Cited

U.S. PATENT DOCUMENTS

| 4,525,245 | A | * | 6/1985 | Berg et al. ..................... 203/51 |
| 4,584,063 | A | * | 4/1986 | Berg et al. ..................... 203/51 |
| 4,775,489 | A | * | 10/1988 | Watkins et al. ............... 507/202 |
| 5,302,313 | A | * | 4/1994 | Asano et al. ................. 510/412 |
| 5,334,253 | A | * | 8/1994 | Berg ........................... 127/63 |
| 2003/0171240 | A1 | * | 9/2003 | Hanada et al. .............. 510/407 |
| 2005/0112165 | A1 | * | 5/2005 | Taylor ........................ 424/405 |

* cited by examiner

*Primary Examiner*—Gregory E Webb
(74) *Attorney, Agent, or Firm*—Steven D. Boyd

(57) ABSTRACT

The present invention concerns the field of fluorinated hydrocarbons and relates to novel compositions containing fluorinated hydrocarbons and oxygenated solvents. More particularly, the compositions comprise a fluorinated base, diacetone alcohol (DAA), and DMSO and/or secondary butanol. These novel compositions can be used in particular in all solvent applications of HCFC 141*b* (hydrochlorofluorocarbon 141*b*), in particular in various operations for treating solid surfaces, such as the cleaning, degreasing, defluxing or drying of solid surfaces.

8 Claims, 1 Drawing Sheet

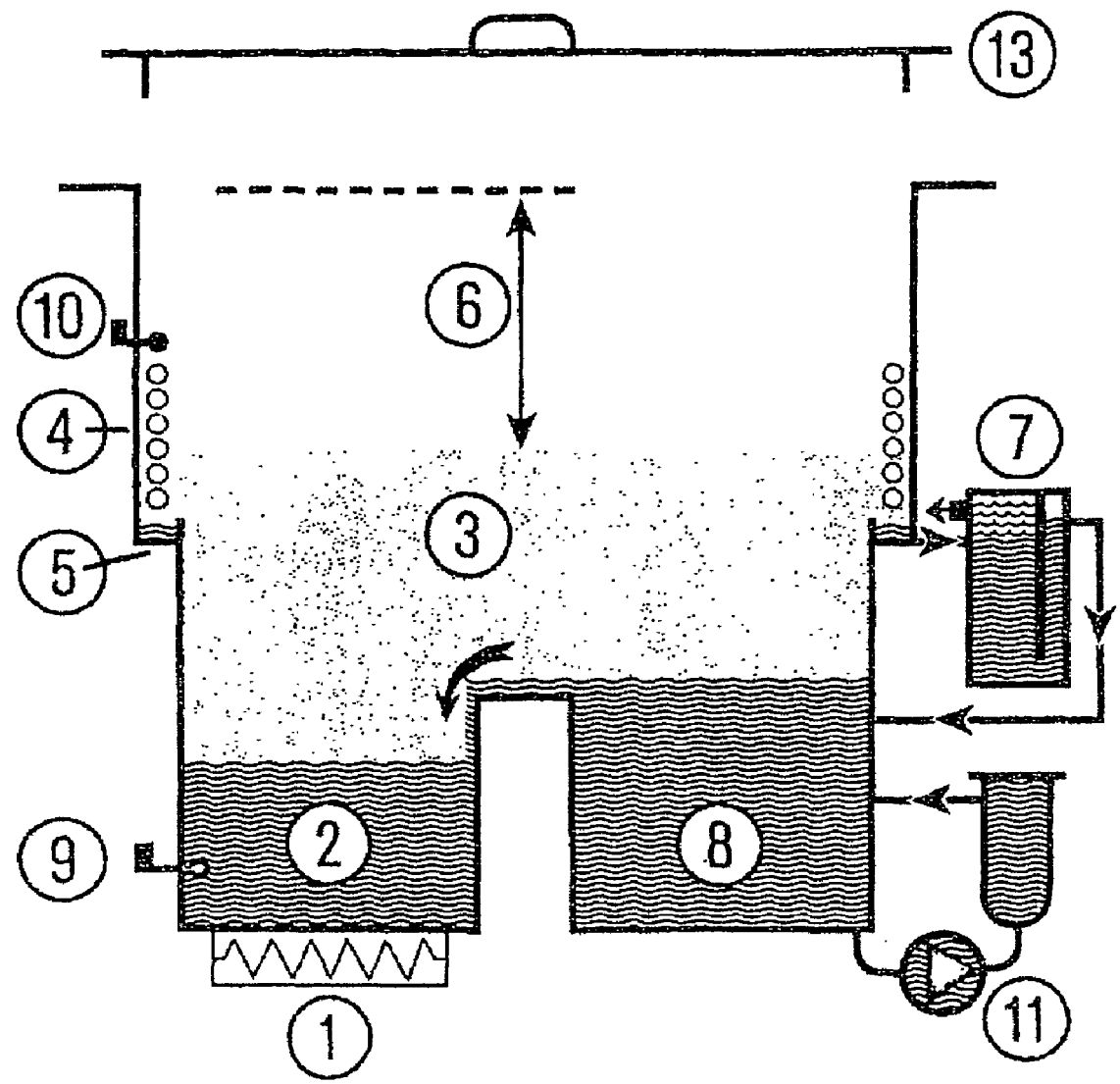

COMPOSITIONS CONTAINING FLUORINATED HYDROCARBONS AND OXYGENATED SOLVENTS

FIELD OF THE INVENTION

The present invention concerns the field of fluorinated hydrocarbons and relates to novel compositions containing fluorinated hydrocarbons and oxygenated solvents. More particularly, the compositions comprise a fluorinated base, diacetone alcohol (DAA), and DMSO and/or secondary butanol.

These novel compositions can be used in particular in all solvent applications of HCFC 141b (hydrochlorofluorocarbon 141b), in particular in various operations for treating solid surfaces, such as the cleaning, degreasing, defluxing or drying of solid surfaces.

BACKGROUND OF THE INVENTION

The present invention concerns the field of fluorinated hydrocarbons, and more particularly relates to novel compositions containing fluorinated hydrocarbons and oxygenated solvents. These novel compositions can be used in particular in all solvent applications of HCFC 141b (hydrochlorofluorocarbon 141b), in particular in various operations for treating solid surfaces, such as the cleaning, degreasing, defluxing or drying of solid surfaces.

1,1-dichloro-1-fluoroethane (known as HCFC 141B) is widely used in industry for the cleaning and degreasing of a very wide variety of solid surfaces (metallic, glass, plastic or composite components) where an absence, or at least the lowest possible residual content, of impurities, in particular of organic nature, is required. Mention may be made of its use for the degreasing of heavy metal components and for the cleaning of high-quality, high-precision mechanical components in the most varied of industries, such as aeronautics, aerospace, electronics, mechanics, the goldsmith trade, the cutlery industry, the manufacture of timepieces, medical prosthesis. Mention may also be made of its use in the field of printed circuit manufacture, for removing residues of the substances used to improve the quality of soldered joints (known as solder flux), this removal operation being referred to as "defluxing".

Besides its thermal and chemical stability, its non-flammability, its low toxicity and its low boiling point (which preserves thermally fragile components), HCFC 141b is found to be particularly effective in these applications due to its low surface tension (18.4 mN/m) and its relatively high solvent power (Kauri-butanol index KBI=51). These latter two chemical properties allow it to have a good ability to dissolve greasy smears, and most particularly those present on complex components comprising holes, recesses or fluting, as may be found in the fields of precision mechanics, the manufacture of timepieces or the cutlery industry, for example.

However, due to its action on the ozone layer, which is not zero (ozone degradation potential ODP=0.11), HCFC 141b is subject to considerable regulations which are increasingly aimed at eliminating it. Thus, the European regulation regarding substances harmful to the ozone layer (no. 2037/2000) has prohibited the use of HCFCs such as HCFC 141b in solvent applications since 1 Jan. 2002, except for the fields of aeronautics and aerospace, where the ban takes effect from 2008 on European soil.

Substitution solutions aimed at replacing HCFC 141b in the abovementioned applications have been proposed, in particular the use of HFC (hydrofluorocarbons) and/or of HFE (hydrofluoro ethers). HFCs and HFEs have no action on the ozone layer (ODP zero or negligible with respect to the regulations in force).

Among the most well-known and most commonly used HFCs, mention may be made, for example, of 1,1,1,3,3-pentafluorobutane (365 mfc), 1,1,1,2,3,4,4,5,5,5-decafluoropentane (4310 mee), 1,1,1,2-tetrafluoroethane (134 a), pentafluoroethane (125), 1,1,1-trifluoroethane (143 a), difluoromethane (32), 1,1-difluoroethane (152 a), 1-fluoroethane (161), 1,1,1,2,3,3,3-heptafluoropropane (227 ea), 1,1,1,3,3,pentafluoropropane (245 fa), octafluoropropane (218), (perfluorobutyl)ethylene ($C_4H_9CH=CH_2$), 1,1,2,2,3,4,5-heptafluorocyclopentane ($C_5H_3F_7$), perfluorohexylethylene ($C_6F_{13}CHCH_2$), tridecafluorohexane ($C_6F_{13}H$) and perfluoro (methylmorpholine) (PF 5052) and also their mixtures which may contribute to improving certain properties, such as non-flammability, for example.

Among the most well-known and most commonly used HFEs, mention may be made, for example, of methylheptafluoropropyl ether ($C_3F_7OCH_3$), methylnonafluorobutyl ether ($C_4F_9OCH_3$), ethylnonafluorobutyl ether ($C_4F_9OC_2H_5$) and perfluoropyran ($C_5F_{10}O$), and also their mixtures.

HFCs and HFEs exhibit physicochemical properties comparable to those of HCFC 141b: good thermal and chemical stability, low toxicity, low boiling point, low surface tension. However, their solvent power does not reach that of HCFC 141b. The Kauri-butanol indices (KBIs) are respectively 9 and 10 for HFC 4310 mee and HFE $C_4F_9OCH_3$, compared to 51 for HCFC 141b. As a result of this, the effectiveness of these compounds in applications for treating solid surfaces is clearly less than that of HCFC 141b.

DETAILED DESCRIPTION OF THE INVENTION

Unexpectedly, it has been found that, by adding 4-hydroxy-4-methyl-2-pentanone, also called diacetone alcohol (which will subsequently be referred to as DAA), with dimethyl sulfoxide (which will subsequently be referred to as DMSO) and/or secondary butanol to a fluorinated base consisting of a mixture of one or more halogenated compounds having a surface tension of less than 30 mN/m (according to the standard ISO 304-1985) and a negligible action on the ozone layer (zero or negligible ODP), novel compositions are obtained which exhibit performances in use equivalent to those of HCFC 141b. In addition, these compositions lack the destructive effect on the ozone layer. They therefore constitute an entirely satisfactory alternative to HCFC 141b in the fields of use of this solvent.

A subject of the present invention is therefore compositions comprising a fluorinated base, diacetone alcohol (DAA), and DMSO and/or secondary butanol.

Unless otherwise indicated, the percentages used in the present text to indicate the content of the compositions according to the invention are percentages by weight.

The compositions according to the invention advantageously comprise from 1 to 88% of fluorinated base, from 5 to 94% of DM, and from 5 to 70% of DMSO and/or of secondary butanol. The content of DMSO or of secondary butanol is advantageously at most equal to the content of DAA. Preferably, the compositions of the invention comprise from 5 to 80% of fluorinated base, from 15 to 85% of DAA, and from 5 to 50% of DMSO and/or secondary butanol.

The expression "fluorinated base which can be used in the compositions according to the invention" is intended to mean a mixture of one or more halogenated compounds having a surface tension of less than 30 mN/m and a negligible action on the ozone layer (zero or negligible ODP). The halogenated compound(s) can be chosen from hydrofluorocarbons (HFCs) and/or hydrofluoro ethers (HFEs).

As nonlimiting examples of HFCs, mention may be made of 1,1,1,3,3-pentafluorobutane (365 mfc), 1,1,1,2,3,4,4,5,5,5-decafluoropentane (4310 mee), 1,1,1,2-tetrafluoroethane (134 a), pentafluoroethane (125), 1,1,1-trifluoroethane (143 a), difluoromethane (32), 1,1-difluoroethane (152 a), 1-fluoroethane (161), 1,1,1,2,3,3,3-heptafluoropropane (227 ea), 1,1,1,3,3,pentafluoropropane (245 fa), octafluoropropane (218), (perfluorobutyl)ethylene ($C_4H_9CH=CH_2$), 1,1,2,2,3,4,5-heptafluorocyclopentane ($C_5H_3F_7$), perfluorohexylethylene ($C_6F_{13}CHCH_2$), tridecafluorohexane ($C_6F_{13}H$) and perfluoro(methylmorpholine) (PF 5052).

As nonlimiting examples of HFEs, mention may be made of methylheptafluoropropyl ether ($C_3F_7OCH_3$), methylnonafluorobutyl ether ($C_4F_9OCH_3$), ethylnonafluorobutyl ether ($C_4F_9OCH_2H_5$) and perfluoropryran ($C_5F_{10}O$).

Most of these compounds are commercially available.

Among the fluorinated bases which can be used in the compositions according to the invention, mention may be made, for example, of the binary or ternary mixtures HFC 365 mfc/HFC 4310 mee, HFC 365 mfc/HFC 4310 mee/HFC 227 ea and HFC 227 ea/HFE.

Preferably, mixtures of HFC 365 mfc and HFC 4310 mee are used as fluorinated base. Advantageously, these mixtures comprise from 5 to 95% of HFC 365 mfc and from 5 to 95% of HC 4310 mee. These mixtures can optionally contain HFC 227 ea. A preferred mixture consists of 80% of HFC 365 mfc and 20% of HFC 4310 mee. Another preferred mixture consists of 50% of HFC 365 mfc and 50% of HFC 4310 mee.

The fluorinated base can also contain trans-1,3-dichloroethylene, the boiling point of which is 47.8° C.

A particularly advantageous composition according to the invention consists of 50% of fluorinated base, 40% of DAA and 10% of DMSO. Another advantageous composition consists of 30% of fluorinated base, 23.33% of DAA, 23.33% of secondary butanol and 23.33% of DMSO.

The compositions according to the invention can be easily prepared by simply mixing the constituents.

The compositions according to the invention can in particular be used in the same applications, and be used according to the same methods, as the prior compositions based on HCFC 141b. They are therefore particularly suited to the use for the treatment of solid surfaces, such as the cleaning, degreasing or drying of solid surfaces, or the defluxing of printed circuits. For these applications, besides HCFC 141b, use is generally made of, firstly, heavier solvents such as petroleum fractions or mixtures of heavy glycol ether-based solvents or mixtures of fluorinated base-free solvents and, secondly, aqueous detergents containing surfactants. Compared to these other solutions, the compositions of the invention have many advantages, among which are a lower viscosity and, consequently, a fluidity allowing easier use (in particular compared to the heavy glycol ethers), and much easier rinsing (in particular compared to the petroleum fractions which have a tendency to leave a greasy film). The aqueous detergents require an independent system for rinsing and drying with a solvent and generate effluents which are difficult to eliminate. None of these other solutions can generally be used in the same machines as those functioning with HCFC 141b. It is entirely possible to use the compositions of the invention in the machines functioning with HCFC 141b, and they are found to be superior to these other solutions in terms of performance and much more polyvalent.

A machine and a scheme for functioning, illustrating a known embodiment for the treatment of solid surfaces, represented in the single FIGURE, are described below.

The machine comprises two tanks, a cleaning tank (2) and a rinsing tank (8), and a cover (13). The tanks (2) and (8) are preferably tall and narrow so as to correctly trap the solvent vapours. They can be equipped with ultrasound systems which are used when the components to be cleaned are not too fragile.

At the outset, the cleaning tank (2) containing a cleaning composition according to the invention is brought to the boiling point of the fluorinated base present in the composition, using the heating resistance (1). Since the boiling point of the DAA (168° C.), of the DMSO (189° C.) and of the secondary butanol (99.5° C.) are clearly higher than the boiling point of the fluorinated base (generally less than 55° C.), the mixture of these solvents remains in the liquid phase of the cleaning bath (2), without undergoing any notable evaporation.

The rinsing tank (8) is filled with fluorinated base alone.

The vapours (3) of fluorinated base derived from boiling the tank (2) are recycled in the rinsing tank (8) via a cooling coil 4 and recovery in a channel (5). The temperature probes (9) and (10) make it possible to control the temperatures of the liquid and vapour phases. The role of the separator (7) is to separate the water originating from the condensation of the steam from the atmosphere. The cleaning tank (2) is fed with relatively clean recycled fluorinated base via an overflow system from tank (8), the percentage soiling being a maximum of 10% compared to the cleaning tank. The pump (11) allows filtration of the solvent in order to retain in particular the solid particles. In a manner similar to the use of HCFC 141b, the cleaning bath may be changed when the latter contains approximately 30% soiling.

The use of this machine consists in initially immersing the component to the cleaned in the cleaning tank (2).

The surface to be treated may be metallic, or made of mineral glass, of ceramic or else of organic polymer.

The surface to be cleaned may be coated with various fatty substances of animal, plant, mineral or else synthetic origin, such as, for example, liquid petroleum jelly, water-soluble oils or whole oils. It may be coated with solder flux.

Without the applicant being held to an explanation, it thinks that the DMSO and/or secondary butanol in the cleaning bath promotes conversion of the oil present on the surface to droplets. The DAA detaches the droplets and plays the role of detergent. It has been found that the secondary butanol has a particularly beneficial effect for removal of solder fluxes. It constitutes, with the DAA, a very good additive to the fluorinated base for this application. When the fluxes are very difficult to remove, the incorporation of DMSO also makes it possible to increase the polarity and to attain very good effectiveness.

The cleaned component is then immersed in the rinsing bath (8). Through an effect of entrainment over the surface of the components, the rinsing bath (8) consisting of pure fluorinated base may gradually become polluted with the fatty substances. A second rinsing bath can be used in the event of considerable entrainment. Further rinsing in the region (3)

comprising the fluorinated base in the vapour phase can also be carried out before drying in the cold region (6) of the machine.

Another subject of the invention is therefore a method for treating solid surfaces, performed in a machine comprising a cleaning tank (2) and a rinsing tank (8), characterized in that the cleaning tank (2) is filled with a composition according to the invention and the rinsing tank (8) is filled with a pure fluorinated base, this fluorinated base being identical to or different from that present in the cleaning tank (2).

According to a preferred variant of the method according to the invention, the fluorinated base present in the rinsing tank is identical to that present in the cleaning tank. This method of carrying out the procedure makes it possible to obtain clean dry components free of residual oils or solder flux and free of traces of solvent. In cases where cleaning is difficult, it will be preferable to use a cleaning composition comprising a high content of fluorinated base, at least 30% of fluorinated base; since the cleaning composition already contains the rinsing formula, the rinsing operation will thus be facilitated. If the rinsing bath(s) contain(s) a fluorinated base other than that present in the cleaning bath, this would not depart from the field of the invention.

The compositions of the invention can also be used in other applications, in particular those of HCFC 141b, for example for the dry cleaning of textiles, for the cleaning of refrigeration plants, as agents for expanding polyurethane foams, or as aerosol propellants, heat-transfer fluids or silicone-depositing agents.

The examples below are given purely by way of illustration of the invention and should in no way be interpreted as a limitation thereof. The percentages used in the examples to indicate the content of the compositions are percentages by weight.

EXAMPLE 1

To evaluate the degreasing efficiency of various compositions of the invention, stainless steel plates with a surface area of 8 cm² are used. Each plate is coated with oil by spreading a large drop of oil out over one of the surfaces. The plate is soaked for 5 minutes at ambient temperature in a beaker containing 50 ml of test composition. Then, the plate is removed from the beaker, drained, and immersed for 2 minutes at ambient temperature in a second beaker containing 50 ml of pure fluorinated base. No agitation is used during these two phases. The plate is then dried at ambient temperature for a few seconds until the fluorinated base has evaporated. The degreasing efficiency is determined by visual evaluation of the proportion of surface of the plate which is free of oil. The notation used can be summarized in table 1.

TABLE 1

| Observation on the plate | Degreasing power |
|---|---|
| >90% | Very good |
| >70% | Good |
| <70% | Average |

Three types of oil were used to carry out the tests:

cosmetic liquid petroleum jelly water-soluble SHRADER oil

MOBIL CUTREX 734 oil

The results obtained with the various compositions tested appear in table 2.

TABLE 2

| | Composition by % weight | | | | Degreasing power | | |
|---|---|---|---|---|---|---|---|
| | | | Fluorinated base | | | | |
| | | | HFC | HFC | | | |
| Composition reference | DAA | DMSO | 365 mfc | 4310 mee | Liquid petroleum jelly | SHRADER oil | CUTREX 734 oil |
| L1 | 40 | 10 | 40 | 10 | Good | Good | Very good |
| L2 | 5 | 45 | 40 | 10 | Very good | Good | Average |
| L3 | 20 | 5 | 60 | 15 | Good | Good | Very good |
| L4 | 85 | 5 | 5 | 5 | Very good | Good | Very good |
| L5 | 10 | 5 | 65 | 20 | Good | Good | Average |

The formulations according to the invention make it possible to obtain plates on which most of the surface area is free of oil; they have good degreasing properties with respect to the three oils tested.

EXAMPLE 2

For this example, use is made of the degreasing machine with reference to the single figure.

The cleaning tank (2) is filled with 5 liters of degreasing composition given the reference L1 in example 1. The cleaning bath is brought to the boiling point of the fluorinated base, namely 40° C.

The rinsing tank (8) is filled with 5 liters of the same pure fluorinated base composed of 80% of HFC 365 mfc and 20% of HCF 4310 mee. The temperature of the rinsing tank (8) is 40° C.

A gold plated, light metal component from the aerospace industry, parallelepipedal in shape, the dimensions of which are approximately 10×15×3 cm, containing holes and channels, and coated with a whole oil called Variotcut D734 from CASTROL (approximately 1 g), were immersed in the cleaning tank (2) for 3 minutes and then in the rinsing tank (8) for one minute. A second rinse was carried out in the vapour phase (3) for 10 seconds and the drying was carried out in the cold region of the machine (6) for 10 seconds.

The component was completely degreased under these conditions.

COMPARATIVE EXAMPLE 3

The same operating conditions as those for example 2 are used, but the cleaning tank (2) is filled with pure fluorinated base composed of 80% of HFC 365 mfc and 20% of HFC 4310 mee, as is the rinsing tank (8).

After cleaning, rinsing and drying, the component comprises residual traces of oil.

EXAMPLE 4

Example 2 is reproduced, changing the nature of the degreasing composition in the cleaning tank (2) (table 3). The rinsing tank (8) is filled with pure fluorinated base composed of 80% of HFC 365 mfc and 20% of HFC 4310 mee.

TABLE 3

| | Fluorinated base | | | | |
|---|---|---|---|---|---|
| Composition | HFC 365 mfc | HFC 4310 mee | DAA | DMSO | Secondary butanol |
| M1 | 2 | 28 | 55 | 15 | |
| M2 | 8 | 12 | 26.67 | 26.67 | 26.67 |
| M3 | 4 | 21 | 25 | 25 | 25 |

All these compositions gave excellent degreasing results.

EXAMPLE 5

To evaluate the defluxing efficiency of two compositions of the invention, use is made of a cleaning machine with reference to the single figure (machine equipped with ultrasound, Ultrason Annemasse) and a separator (7) filled with siliporite. The tanks (2) and (8) have a capacity of 20 liters.

The cleaning tank (2) is filled with defluxing composition and the temperature is brought to the boiling point, namely 67° C.

The rinsing tank (8) is filled with fluorinated base alone. The temperature of the rinsing tank is the boiling point of the fluorinated base, namely 40° C.

The components to be cleaned (electronic boards) are immersed in the cleaning bath for approximately 3 to 5 minutes, and then in the rinsing bath for 2 minutes. The drying is then carried out directly in the cold region (6) of the machine.

The compositions M4 and M6 (table 4) were tested.

TABLE 4

| | Fluorinated BASE | | | | |
|---|---|---|---|---|---|
| Composition | HFC 365 mfc | HFC 4310 mee | DAA | DMSO | Secondary butanol |
| M4 | 8 | 32 | 25 | | 35 |
| M5 | 4 | 26 | 23.33 | 23.33 | 23.33 |

The composition M4 gave excellent defluxing results for electronic boards with synthetic colophony. The composition M5 made it possible to remove difficult solder fluxes called "no clean".

The invention claimed is:

1. Composition comprising a fluorinated base selected from the group consisting of hydrofluorocarbons, hydrofluoro ethers and mixtures thereof, diacetone alcohol, and dimethyl sulfoxide and optionally secondary butanol.

2. Composition according to claim 1, comprising from 1 to 88% by weight of fluorinated base, from 5 to 94% by weight of diacetone alcohol, and from 5 to 70% by weight of dimethyl sulfoxide and optionally secondary butanol.

3. Composition according to claim 1, comprising from 5 to 80% of fluorinated base, from 15 to 85% of diacetone alcohol and from 5 to 50% of dimethyl sulfoxide and optionally secondary butanol.

4. Composition according to claim 1 wherein said fluorinated base comprises one or more halogenated compounds having a surface tension of less than 30 mN/m and a zero ozone degradation potential.

5. Composition according to claim 1 wherein said composition further comprises trans-1,2-dichloroethylene.

6. Composition according to claim 1, wherein said hydrofluorocarbons are selected from the group consisting of 1,1,1,3,3-pentafluorobutane (HFC 365 mfc), 1,1,1,2,3,4,4,5,5,5-decafluoropentane (HFC 4310 mee), 1,1,1,2-tetrafluoroethane (HFC 134 a), pentafluoroethane (HFC 125), 1,1,1-trifluoroethane (HFC 143 a), difluoromethane (HFC 32), 1,1-difluoroethane (HFC 152 a), 1-fluoroethane (HFC 161), 1,1,1,2,3,3,3-heptafluoropropane (HFC 227 ea), 1,1,1,3,3, pentafluoropropane (HFC 245 fa), octafluoropropane (HFC 218), (perfluorobutyl)ethylene ($C_4H_9CH{=}CH_2$), 1,1,2,2,3,4,5-heptafluorocyclopentane ($C_5H_3F_7$), perfluorohexylethylene ($C_6F_{13}CHCH_2$), tridecafluorohexane ($C_6F_{13}H$) and perfluoro(methylmorpholine) (PF 5052).

7. Composition according to claim 4 wherein said fluorinated base comprises a mixture of 1,1,1,3,3-pentafluorobutane and 1,1,1,2,3,4,4,5,5,5-decafluoropentane and, optionally, 1,1,1,2,3,3,3-heptafluoropropane.

8. Composition according to claim 4, wherein said one or more halogenated compounds are selected from the group consisting of methylheptafluoropropyl ether ($C_3F_7OCH_3$), methylnonafluorobutyl ether ($C_4F_9OCH_3$), ethylnonafluorobutyl ether ($C_4F_9OC_2H_5$) and perfluoropyran ($C_5F_{10}O$).

* * * * *